Patented Aug. 18, 1942

2,293,317

UNITED STATES PATENT OFFICE 2,293,317

PURIFICATION OF VINYLIDENE CHLORIDE

Fred Lowell Taylor and Lee H. Horsley, Midland, Mich., assignors to The Dow Chemical Company, Midland, Mich., a corporation of Michigan No Drawing. Application May 1, 1941,
Serial No. 391,346

3 Claims. (Cl. 202—42)

This invention concerns an improved method of purifying monomeric vinylidene chloride.

Vinylidene chloride monomer, whether produced by passing chlorine and ethylene chloride into a molten metal chloride bath according to the method described in U. S. Patent 2,121,548 or by reacting trichloroethane with lime, is found to have certain impurities such as 1.1.1-trichloroethane, 1.1.2-trichloroethane, the cis- and trans-symmetrical dichloroethylenes, and even on occasion, trichloroethylene, vinyl chloride, ethylene chloride, and the like. Such impurities, even in minute quantities, adversely affect the polymerization of the product and give any polymer obtained undesirable properties. They must therefore be removed if satisfactory polymeric products are to be produced. Normal purification methods, as by fractional distillation, have been found to be unsatisfactory, since the monomer polymerizes in the fractionating column.

It is, then, among the objects of the present invention to provide a method of removing impurities from vinylidene chloride monomer even when these are present in minute quantities, whereby polymerization in the purification apparatus is avoided and a purified product readily adaptable to polymerization is obtained.

It has now been discovered that when monomeric vinylidene chloride is mixed with methanol, and the mixture is distilled, an azeotropic mixture of the two materials is obtained and that the azeotrope leaves the higher boiling impurities as residue. Thus, by the continuous addition to the distillation zone of crude vinylidene chloride monomer and methanol, continuous purification may be obtained and the residue constituting the impurities may be drawn off and discarded at intervals. The azeotropic proportions are approximately 6 per cent methanol by volume and 94 per cent monomeric vinylidene chloride.

Briefly, the invention involves distilling an azeotrope consisting of monomeric vinylidene chloride and methanol, and separating the vinylidene chloride from the thus-obtained condensate.

The following example will serve to further clarify the principle of the invention and its operation.

A charge composed of 49.4 pounds of crude vinylidene chloride monomer (containing such impurities as trichloroethane, ethylene chloride, small proportions of symmetrical dichloroethylene and the like) and 6.75 pounds of methanol was distilled in a stainless steel fractionating column, coming over at a temperature of 30°–33.5° C. under 900 millimeters of mercury pressure. The product weighed 51 pounds representing 91 per cent of the mixture distilled over in this temperature range. The balance of the mixture contained the impurities and less than .25 of 1 per cent vinylidene chloride.

The azeotropic distillate contained by volume approximately 6 per cent methanol and about 94 per cent of vinylidene chloride and was, further, found to have a boiling point of 27.5°–28° C. at 760 millimeters. This mixture was washed with water to remove the methanol, and the pure monomer stored under suitable conditions for future use.

The azeotropic distillation may be carried out under superatmospheric or subatmospheric pressure as well as under normal pressures. The higher pressures are generally found to be more desirable, since the need for a special cooling medium in the condenser is then obviated.

In operating the process according to the invention, an excess of the methanol is usually added to the crude monomer since such excess does no harm and is insurance that all the vinylidene chloride is included in the azeotrope.

The part of the distilling column which comes in contact with the vinylidene chloride monomer should be made of material which does not contaminate the product. Among the desirable materials of construction are nickel, glass, and stainless steel.

It is not intended to limit the invention to the purification of vinylidene chloride monomer obtained from trichloroethane or by chlorinating and cracking ethylene chloride. Since the vinylidene chloride forms an azeotrope with methanol, any compounds not combining with the azeotrope and boiling above or below the point at which the azeotrope is distilled can be separated from the monomer by the method of the invention. In the case of impurities, such as vinyl chloride, which boil lower than monomeric vinylidene chloride, removal may be by evaporation or distillation either before or after introduction of the methanol into the impure monomer.

We claim:

1. In a method of purifying vinylidene chloride monomer, the steps of distilling monomeric vinylidene chloride as an azeotrope from a mixture thereof with not less than 6 per cent of its volume of methanol, and separating the vinylidene chloride from the thus-obtained condensate.

2. In a method of purifying vinylidene chloride monomer, the steps of distilling monomeric vinylidene chloride as an azeotrope from a mixture thereof with not less than 6 per cent of its volume of methanol, and separating the vinylidene chloride from the thus-obtained condensate by washing with water.

3. In a method of purifying vinylidene chloride monomer, the steps which include, adding to the impure monomeric vinylidene chloride sufficient methanol to remove the monomer by azeotropic distillation, distilling the mixture to separate an azeotrope composed of vinylidene chloride and methanol, and separating purified vinylidene chloride from the distillate.

FRED LOWELL TAYLOR.
LEE H. HORSLEY.